(12) United States Patent
Andrews, III et al.

(10) Patent No.: US 7,945,070 B2
(45) Date of Patent: May 17, 2011

(54) GEOGRAPHIC-BASED WATERMARKING KEYS

(75) Inventors: Hoyet Harrison Andrews, III, San Antonio, TX (US); Stuart Filip Rosove, Lake Oswego, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1219 days.

(21) Appl. No.: 11/362,430

(22) Filed: Feb. 24, 2006

(65) Prior Publication Data
US 2007/0204163 A1    Aug. 30, 2007

(51) Int. Cl.
*G06K 9/00* (2006.01)
(52) U.S. Cl. .......................... 382/100; 713/176
(58) Field of Classification Search .................. 382/100, 382/232; 380/54, 210, 252, 287; 713/176; 704/200.1, 273; 381/73.1; 348/460, 463
See application file for complete search history.

(56) References Cited

U.S. PATENT DOCUMENTS

| | | | |
|---|---|---|---|
| 5,329,108 A | 7/1994 | Lamoure |
| 5,636,292 A | 6/1997 | Rhoads |
| 5,694,471 A | 12/1997 | Chen et al. |
| 5,822,432 A | 10/1998 | Moskowitz et al. |
| 5,862,260 A | 1/1999 | Rhoads |
| 5,864,623 A | 1/1999 | Messina et al. |
| 5,889,868 A | 3/1999 | Moskowitz et al. |
| 5,943,422 A | 8/1999 | Van Wie et al. |
| 5,974,548 A | 10/1999 | Adams |
| 6,081,907 A | 6/2000 | Witty |
| 6,119,944 A | 9/2000 | Mulla et al. |
| 6,260,029 B1 | 7/2001 | Critelli |
| 6,282,362 B1 | 8/2001 | Murphy et al. |
| 6,345,104 B1 | 2/2002 | Rhoads |
| 6,363,480 B1 | 3/2002 | Perlman |
| 6,408,082 B1 | 6/2002 | Rhoads et al. |
| 6,442,285 B2 | 8/2002 | Rhoads et al. |
| 6,449,377 B1 | 9/2002 | Rhoads |
| 6,463,416 B1 | 10/2002 | Messina |
| 6,496,802 B1 | 12/2002 | Van Zoest et al. |
| 6,504,571 B1 | 1/2003 | Narayanaswami et al. |
| 6,557,103 B1 | 4/2003 | Boncelet et al. |
| 6,608,911 B2 | 8/2003 | Lofgren et al. |
| 6,614,914 B1 | 9/2003 | Rhoads et al. |

(Continued)

FOREIGN PATENT DOCUMENTS

WO      WO 9953428      10/1999

(Continued)

OTHER PUBLICATIONS

Jun. 6, 2007 Office Action from Assignee's U.S. Appl. No. 10/816,175.

(Continued)

*Primary Examiner* — Anand Bhatnagar

(57) ABSTRACT

The disclosure relates generally to digital watermarking and steganography, e.g., for use with cell phones and signal processing. One claim recites a method including, in a cell phone, determining a current geographic are of the cell phone; selecting a first digital watermark detector that is associated with the current geographic area, a selected first digital watermark detector being selected from a plurality of different digital watermark detectors; and controlling the cell phone to employ the selected first digital watermark detector to analyze a signal to obtain a digital watermark message there from, wherein the selected first digital watermark detector corresponds to a particular digital watermark embedder that is uniquely assigned to the geographic area. Other claims and combinations are provided too.

26 Claims, 4 Drawing Sheets

U.S. PATENT DOCUMENTS

| | | |
|---|---|---|
| 6,664,976 B2 | 12/2003 | Lofgren et al. |
| 6,704,869 B2 | 3/2004 | Rhoads et al. |
| 6,721,437 B1 | 4/2004 | Ezaki et al. |
| 6,751,336 B2 | 6/2004 | Zhao |
| 6,769,061 B1 | 7/2004 | Ahern |
| 6,804,378 B2 | 10/2004 | Rhoads |
| 6,826,546 B1 | 11/2004 | Shuster |
| 6,882,737 B2 | 4/2005 | Lofgren et al. |
| 6,894,794 B1 | 5/2005 | Patton et al. |
| 6,910,136 B1 | 6/2005 | Wasserman |
| 6,947,571 B1 | 9/2005 | Rhoads et al. |
| 6,970,573 B2 | 11/2005 | Carr et al. |
| 6,975,744 B2 | 12/2005 | Sharma et al. |
| 6,993,152 B2 | 1/2006 | Patterson et al. |
| 7,007,243 B2 | 2/2006 | Baldino |
| 7,016,516 B2 | 3/2006 | Rhoads |
| 7,027,612 B2 | 4/2006 | Patterson et al. |
| 7,042,470 B2 | 5/2006 | Rhoads et al. |
| 7,222,235 B1 | 5/2007 | Mitsui |
| 7,333,615 B1 | 2/2008 | Jarboe et al. |
| 2001/0037455 A1 | 3/2001 | Lawandy |
| 2002/0107803 A1 | 8/2002 | Lisanke et al. |
| 2002/0166050 A1 | 11/2002 | Takahashi |
| 2002/0186861 A1 | 12/2002 | Echizen et al. |
| 2002/0194476 A1 | 12/2002 | Lewis et al. |
| 2003/0076955 A1 | 4/2003 | Alve et al. |
| 2003/0083942 A1 | 5/2003 | Mallon et al. |
| 2004/0008866 A1* | 1/2004 | Rhoads et al. ............... 382/100 |
| 2004/0049401 A1 | 3/2004 | Carr et al. |
| 2004/0181671 A1 | 9/2004 | Brundage et al. |
| 2004/0258274 A1 | 12/2004 | Brundage et al. |
| 2005/0010776 A1 | 1/2005 | Kenen |
| 2005/0063027 A1 | 3/2005 | Kenen et al. |
| 2005/0169498 A1* | 8/2005 | Choi et al. .................... 382/100 |
| 2005/0169499 A1* | 8/2005 | Rodriguez et al. ............ 382/100 |
| 2005/0213790 A1 | 9/2005 | Rhoads et al. |
| 2005/0226461 A1 | 10/2005 | Goldberg et al. |
| 2005/0271246 A1 | 12/2005 | Sharma et al. |
| 2007/0025591 A1* | 2/2007 | Rhoads et al. ............... 382/100 |
| 2007/0176739 A1* | 8/2007 | Raheman ..................... 340/5.64 |
| 2008/0310673 A1* | 12/2008 | Petrovic et al. .............. 382/100 |

FOREIGN PATENT DOCUMENTS

| | | |
|---|---|---|
| WO | WO 0007356 | 2/2000 |
| WO | WO 01/95249 | 12/2001 |
| WO | WO01/95249 | 12/2001 |
| WO | WO 2007/100963 | 9/2007 |
| WO | WO2007/100963 | 9/2007 |

OTHER PUBLICATIONS

International Search Report dated Feb. 15, 2008 in PCT/US07/61693.

U.S. Appl. No. 09/636,102, filed Aug. 10, 2000, Ramos et al.

U.S. Appl. No. 11/361,672, filed Feb. 24, 2006, Rodriguez.

Aug. 24, 2010 Amendment; Mar. 24, 2010 non-final Office Action; Dec. 17, 2009 Amendment; Jul. 23, 2009 non-final Office Action; Apr. 24, 2009 Amendment; Nov. 25, 2008 non-final Office Action; Oct. 22, 2008 Amendment; Oct. 15, 2008 Restriction Requirement; all from assignee's U.S. Appl. No. 11/082,179 (published as US 2005-0271246 A1).

Nov. 19, 2009 Notice of Abandonment; May 15, 2009 Pre-Brief Appeal Conf. Decision; Apr. 3, 2009 Pre-Brief Conf. Request; Nov. 3, 2008 Final Office Action; Jul. 25, 2008 Amendment; Feb. 25, 2008 non-final Office Action; Nov. 6, 2007 Amendment: Jun. 6, 2007 non-final Office Action; all from U.S. Appl. No. 10/816,175 (published as US 2005-0010776 A1.).

Jun. 12, 2009 Notice of Abandonment; Mar. 31, 2009 BPAI Decision; Jul. 7, 2008 Reply Brief; May 7, 2008 Examiner's Answer; Apr. 11, 2008 Appeal Brief; Oct. 26, 2007 final Office action; Sep. 5, 2007 Amendment; all from U.S. Appl. No. 10/893,149 (published as US 2005-00).

Feb. 15, 2008 Written Opinion of the International Searching Authority from PCT/US07/61693 (published as WO 07/100963).

Nov. 10, 2010 final Office Action and Aug. 24, 2010 Amendment, each from assignee's U.S. Appl. No. 11/082,179 (published as US 2005-0271246A1).

Aug. 10, 2000 transmittal letter, drawings, specification, claims and abstract from U.S. Appl. No. 09/636,102.

* cited by examiner

GEOGRAPHIC-BASED WATERMARKING KEYS

RELATED APPLICATION DATA

This application is generally related to the present assignee's following U.S. patent documents: U.S. Pat. Nos. 5,862,260; 6,442,285; 6,614,914; 6,804,378; 6,947,571; 6,970,573; Ser. No. 10/686,495 (published as US 2004-0181671 A1) and Ser. No. 10/370,421 (published as US 2004-0049401 A1). This application is also related to assignee's concurrently filed U.S. patent application Ser. No. 11/361,672, filed Feb. 24, 2006 (published as US 2007-0204162 A1). Each of the above U.S. patent documents is hereby incorporated by reference.

TECHNICAL FIELD

The present invention relates generally to encoding and decoding objects based on location or geographic clues.

BACKGROUND AND SUMMARY

Digital watermarking continues to proliferate. Watermarking has experienced success across many boundaries—including geographic boundaries. But sometimes boundaries need to be respected, e.g., in terms of content licenses (e.g., content may be licensed for use in one country but not another), laws and social rules, and even equipment manufacturers (e.g., some manufacturers may want certain types of watermark detection while other don't.).

We address geographic boundaries and geographic-based embedding and detection herein.

Digital watermarking—a form of steganography—is a process for modifying media content to embed a machine-readable code into the content. The content may be modified such that the embedded code is imperceptible or nearly imperceptible to the user, yet may be detected through an automated detection process. Most commonly, digital watermarking is applied to media such as images, audio signals, and video signals. However, it may also be applied to other types of data, including text documents (e.g., through line, word or character shifting, background texturing, etc.), software, multi-dimensional graphics models, and surface textures of objects.

Digital watermarking systems have two primary components: an embedding component that embeds the watermark in the media content, and a reading component that detects and reads the embedded watermark. The embedding component embeds a watermark by altering data samples of the media content in the spatial, temporal or some other domain (e.g., Fourier, Discrete Cosine or Wavelet transform domains). The reading component analyzes target content to detect whether a watermark is present. In applications where the watermark encodes information (e.g., a plural-bit message), the reader extracts this information from the detected watermark.

The present assignee's work in steganography, data hiding and digital watermarking is reflected, e.g., in U.S. Pat. Nos. 5,862,260, 6,408,082, 6,614,914, 6,947,571; and in published specifications WO 9953428 and WO 0007356 (corresponding to U.S. Pat. Nos. 6,449,377 and 6,345,104). A great many other approaches are familiar to those skilled in the art. The artisan is presumed to be familiar with the full range of literature concerning steganography, data hiding and digital watermarking. Each of the above patent documents is hereby incorporated by reference.

One aspect of the present invention is a watermark detector and embedder that are closely related to a particular geographical area.

For example, in one implementation, a method is provided including: determining a current geographic area; selecting a first digital watermark detection key that is associated with the current geographic area, a selected first digital watermark detection key being selected from a plurality of digital watermark detection keys; and controlling a digital watermark detector to employ the selected first digital watermark detection key to analyze a signal to obtain a digital watermark message there from, wherein the selected first digital watermark detection key corresponds to a particular digital watermark embedding key that is uniquely assigned to the geographic area.

In another implementation, a method is provided including, in a cell phone, determining a current geographic area of the cell phone; selecting a first digital watermark detector that is associated with the current geographic area, a selected first digital watermark detector being selected from a plurality of different digital watermark detectors; and controlling the cell phone to employ the selected first digital watermark detector to analyze a signal to obtain a digital watermark message there from, wherein the selected first digital watermark detector corresponds to a particular digital watermark embedder that is uniquely assigned to the geographic area.

In still another implementation, a cell phone is provided including: a radio-frequency transceiver; electronic processing circuitry; and memory. The memory includes executable instructions stored therein for processing by the electronic processing circuitry. The instructions include instructions to: determine a current geographic area of the cell phone; select a first digital watermark detector that is associated with the current geographic area, a selected first digital watermark detector being selected from a plurality of different digital watermark detectors; and control the cell phone to employ the selected first digital watermark detector to analyze a signal to obtain a digital watermark message there from. The selected first digital watermark detector corresponds to a particular digital watermark embedder that is uniquely assigned to the geographic area.

Still another implementation is a method including: receiving a signal from a cell phone; determining, based at least in part on the signal, whether the cell phone is physically located in a predetermined home area; and if not in the predetermined home area, communicating a machine-readable code detector to the cell phone for use as its primary machine-readable code detector to detect machine-readable code while outside of its predetermined home area.

Further aspects, implementations, features and advantages will become even more apparent with reference to the following detailed description and accompanying drawings.

DETAILED DESCRIPTION

Figures 1, 6:
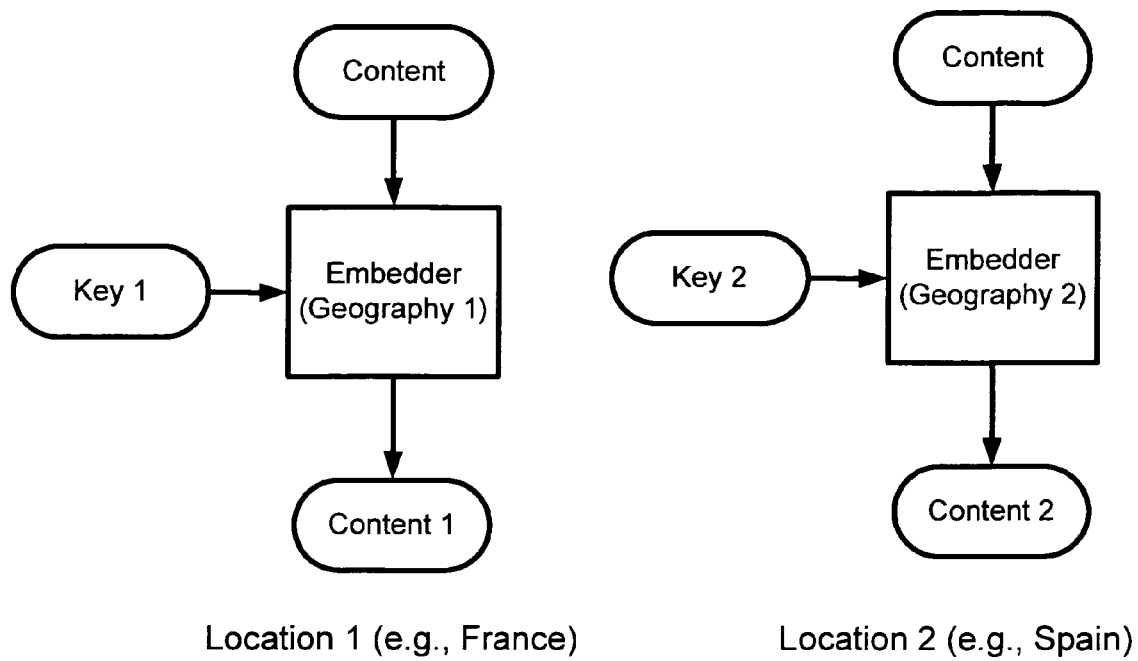
FIG. 1 illustrates embedding content with different keys according to geographic location.
FIG. 6 illustrates a key table include multiple, different keys per each geographic area.

The present assignee has discussed key-based watermarking in a number of patent filings, e.g., in U.S. Pat. No. 6,614,914 and pending U.S. patent application Ser. No. 11/082,179, filed Mar. 15, 2004 (published as US 2005-0271246 A1), which are each hereby incorporated by reference. For example, one or more keys may be used to encrypt a message carried by a digital watermark. And another key or set of keys may be used to control generation of a watermark signal or mapping of information bits in a message to positions in a watermark information signal or carrier signal. A "key" in these contexts serve a function of making a digital watermark un-readable to anyone except those having the proper key.

Assignee's U.S. patent application Ser. No. 09/636,102, which claims the benefit of U.S. Provisional Application No. 60/191,778, discusses a detection system that accommodates different watermark types, perhaps each utilizing different protocols. The watermark protocols provide keys and other parameters specifying how to decode a watermark of a given type. The above patent documents are each hereby incorporated by reference.

U.S. patent application Ser. No. 09/636,102 includes the following disclosure: "As watermark technology proliferates, media objects may have different types of watermarks, each associated with a set of watermark encoders and decoders. To accommodate different watermark types, the decoder can be designed to support different watermark protocols. The watermark protocols provide keys and other parameters specifying how to decode a watermark of a given type. Alternatively, a common Application Programming Interface (API) can be specified for different core watermark encoder and decoder software modules or devices. These schemes facilitate the development of many different types of applications and devices that invoke watermark encoder and decoder functions, yet are independent of the watermark protocol and/or core watermark methods. To support different core watermark methods, the user may install two or more different core watermark encoder/decoder modules. For example, the core modules may be implemented as plug-ins or dynamic link libraries. When installing a module, the installation process updates a registry, such as the registry in the Windows Operating System, to reflect that a watermark type is supported. In this manner, watermark decoders for different media types, and different types of decoders for a single media type may be supported. In cases where a media object contains a watermark of unknown type, the media object file may specify the watermark type, e.g., through a parameter in a file header. The file browser, or other client of the core watermark module, may invoke the appropriate decoder by extracting the type parameter from the media object and passing it and a reference to the media object to the core module via the API. The API routes the request to the appropriate core module, which in turn, extracts the watermark message, and returns it to the API. The API passes the message to the requesting application. In the event that a type parameter is not available, the application or device processing the object may enumerate through all supported watermarking protocols to check if any protocol is present. The watermark protocols for given media or file type may be registered in the device or application (e.g., in a registry of the operating system). To check for each one, the application invokes a watermark screening process for these protocols to determine whether a watermark associated with the protocols is present."

In cases where a media object contains a watermark of an unknown type, a media file may specify the watermark type, e.g., through a parameter in a file header. The file browser, or other client of the core watermark module, may invoke the appropriate decoder by extracting the type parameter from the media object and passing it and a reference to the media file to the core module via an API (application program interface). The API routes the request to the appropriate core module, which in turn, extracts the watermark message, and returns it to the API. The API passes the message to the requesting application.

In the event that a type parameter is not available, the application or device processing the object may enumerate through all supported watermarking protocols to check if any protocol is present.

One improvement utilizes keys to designate or correspond to different geographical areas.

For example, a first (embedding) key is provided for use in a first geographical area or market (e.g., France). A corresponding first (detection) key is needed to decode a media signal embedded with the first (embedding) key.

A second, different (embedding) key is provided for use in a second, different geographical area or market (e.g., Spain). A corresponding second (detection) key is needed to decode a media signal embedded with the second, different (embedding) key.

The first and second keys are used to seed the same watermark embedder.

For example, with reference to FIG. 1, a first media provider located in France embeds first content (e.g., printed materials, audio, video and/or digital images) with a watermark embedder using the first (embedding) key. While a second media provider located in Spain embeds second content (e.g., printed materials, audio, video and/or digital images) with a watermark embedder using the second (embedding) key.

The first content and second content are distributed for public consumption.

In one implementation, watermark detectors are provided along geographical boundaries. That is, a first set of detectors are provided, e.g., in France, that include the first detection key. A second set of detectors are provided, e.g., in Spain, that include the second detection key. The first set of detectors are only able to detect watermarks embedded with the first embedding key while the second set of detectors are only able to detect watermarks embedded with the second embedding key.

But what if I take my cell phone from Spain, which includes a watermark detector including a second detection key, over to France? It seems unfortunate that my cell phone would not be able to detect watermarks in France.

Enter another improvement.

Figure 2:
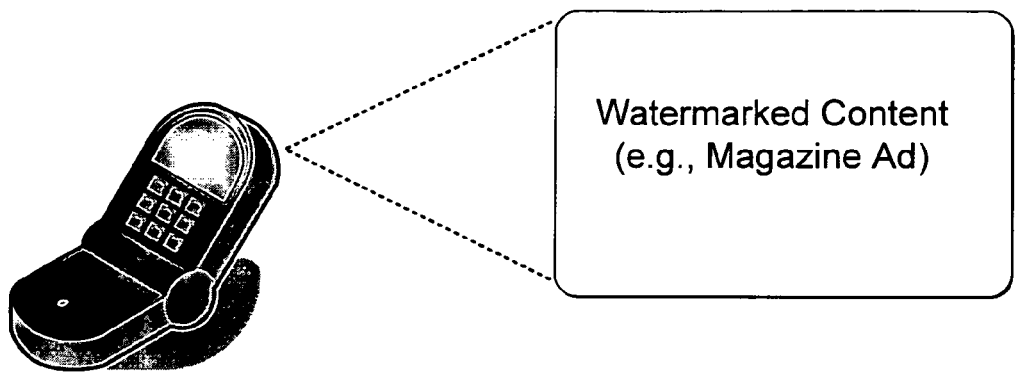
FIG. 2 illustrates a cell phone including an optical sensor (e.g., a digital camera).

A cell phone shown in FIG. 2 includes a digital watermark detector (not shown in FIG. 2). In a first implementation, a watermark detector is configured to cycle through multiple different detection keys. That is, the watermark detector tries to detect a watermark hidden in content using a first detection key. If no watermark is recoverable, the watermark detector employs the second detection key to detect a watermark. If a watermark is still not recoverable, the watermark detector moves onto the third detection key, and so on, until a watermark is detected or until all detection keys are exhausted.

(The same watermark detection process is preferably used each time but detection is altered based on a particular detection key. As discussed above, the key may be a decryption key which is used to decipher a payload. Or, e.g., the key may provide locations within a carrier signal to look for message information, identify a pseudo-random sequence, etc. Successful watermark detection is contingent upon using the right detection key.)

In a second implementation, efficiencies are provided through prioritizing detection keys based on geographic location.

For example, today's cell phones are sophisticated, some having Global Positioning System receivers that provide precise geo-coordinates. Such location information is used to determine which detection key should be tried first. The watermark detector or cell phone can maintain a table or other association (e.g., FIG. 3). Location information is used to interrogate a registry or table to determine which detection key should be prioritized first. For example, geo-coordinates or other location information may indicate that the cell phone is located in Spain. The registry or table indicates that the corresponding detection key is the second detection key, which is associated with Spain. Instead of a GPS-equipped cell phone, the cell phone may receive location information from a cell tower or network, which location information is, e.g., derived based on reception of the cell phone signals at a plurality of different cell towers. More generally, cell towers can provide general location information based on time zones, country or state of operation, tower identifier, etc. (A user can even key in the geographic information; but all told, we prefer an automated approach.)

Regardless of the source of the location information, the location information is used by the cell phone to determine a likely—and corresponding—detection key.

Once a detection key is decided upon, the watermark detector employs the decided upon key for use with watermark detection.

Figure 3:
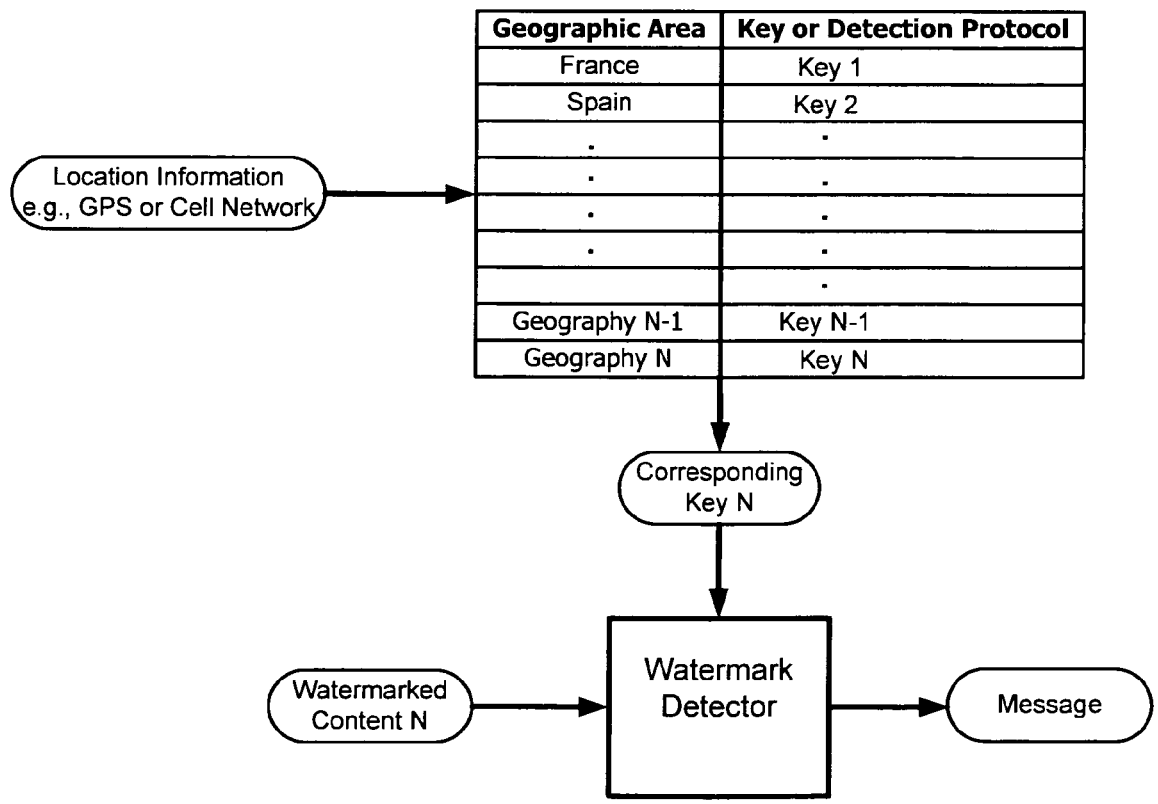
FIG. 3 is a block diagram illustrating a geography based, machine-readable detection.

With reference to FIGS. 2 and 3, a cell phone preferably includes an optical sensor, e.g., a camera, to capture optical scan data. Captured optical scan data—corresponding to watermarked content (e.g., printed magazine advertisement, etc.)—is provided to the watermark detector (FIG. 3). Location information corresponding to a current location of the cell phone is used to select a detection key (Key N) from among a plurality of stored detection keys. The watermark detector employs the selected key during an attempt to detect and read a watermark from the captured optical scan data. If successful, the watermark is decoded to obtain a watermark message. If not successful, other keys can be tried for detection.

The watermark message can be used in a number of applications. For example, the watermark message provides a link to related content as discussed, e.g., in assignee's U.S. Pat. No. 6,947,571, which is hereby incorporated by reference.

The watermark message can also be used to control use or transfer of content. For example, instead of optically sensing an object, an audio or video file is received by the cell phone. The watermark detector sifts through the audio or video looking for a digital watermark embedded therein, based on a key associated with a location of the phone. Once found, the digital watermark is decoded to obtain a message. The message may include or link to usage rights associated with the audio or video. The usage rights control the cell phone regarding, e.g., redistribution or copying of the audio or video.

Some digital watermarks include an orientation component. The orientation component is often helpful in resolving issues such as signal distortion, scaling, rotation, translation, time warping, etc. The curious reader is encouraged to consult assignee's U.S. Pat. Nos. 6,975,744; 6,704,869; 6,614,914; 6,408,082; and 5,636,292 for an even further discussion of steganographic orientation techniques and components. Each of these patent documents is hereby incorporated by reference.

Figure 4:
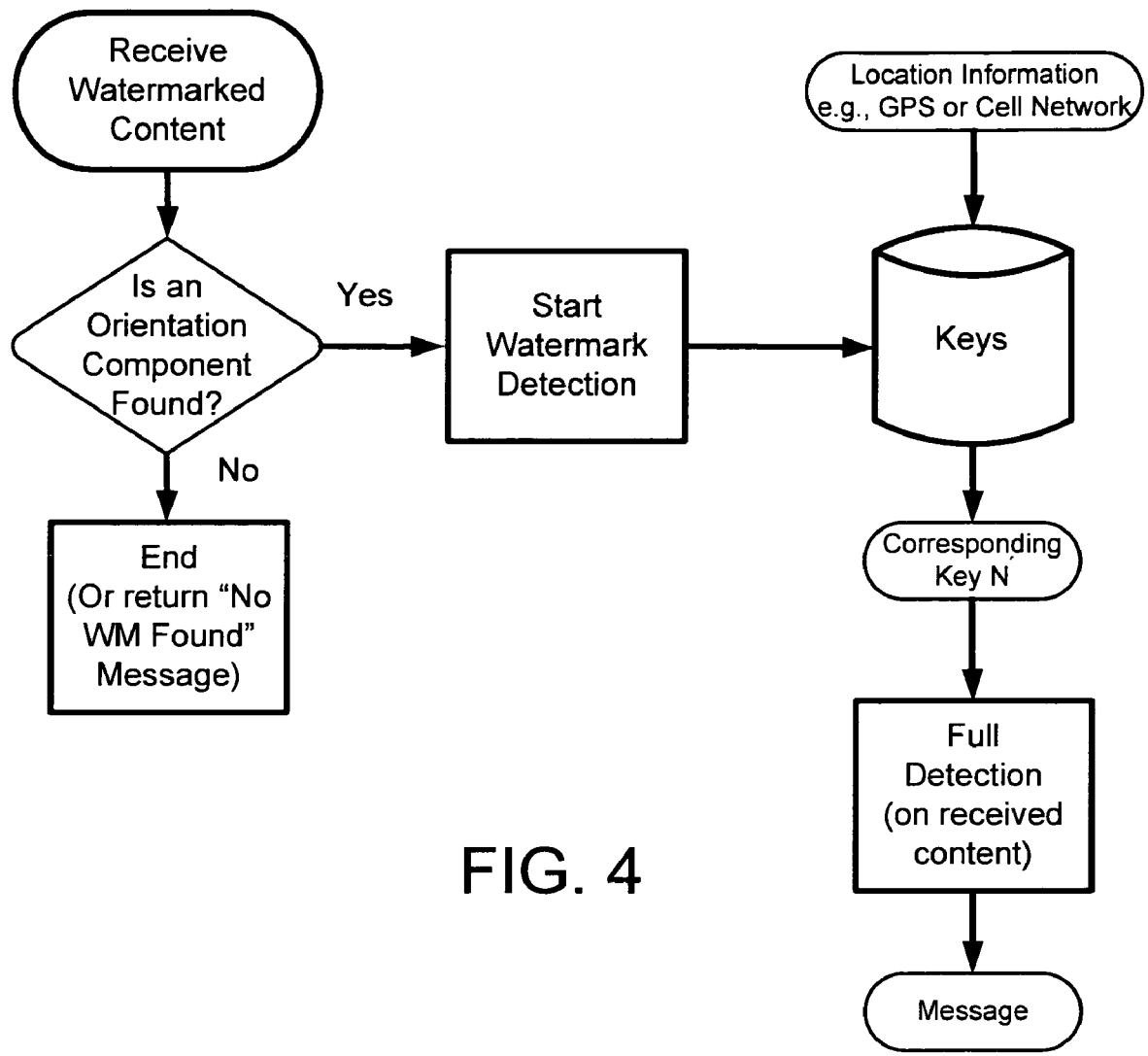
FIG. 4 illustrates a watermark detection process that evaluates whether an orientation component is found, prior to key selection and full watermark message detection.

One implementation of this aspect of the invention first looks for the presence of an orientation component before selecting a key or cycling through different watermarking keys. If an orientation component is detected, a full watermark decoding operation is carried out to detect a message carried by the watermark. If an orientation component is not detected, however, key selection and full watermark detection is not carried out (see FIG. 4). This implementation presupposes that each embedding technique—each utilizing a different embedding key—embeds an orientation component independent of a specific embedding key. This independence will allow detection of at least the orientation component regardless of whatever key is used. The message or message locations, etc. of course can be obfuscated through use of an embedding key.

As an alternative embodiment, instead of using different keys to trigger detection of a particular watermark, different watermark detectors are stored in memory of the cell phone. Each watermark detector corresponds to a particular geographic location. A current location is determined and that location is used to select a particular watermark detector. The selected watermark detector is loaded for execution.

Figure 5:
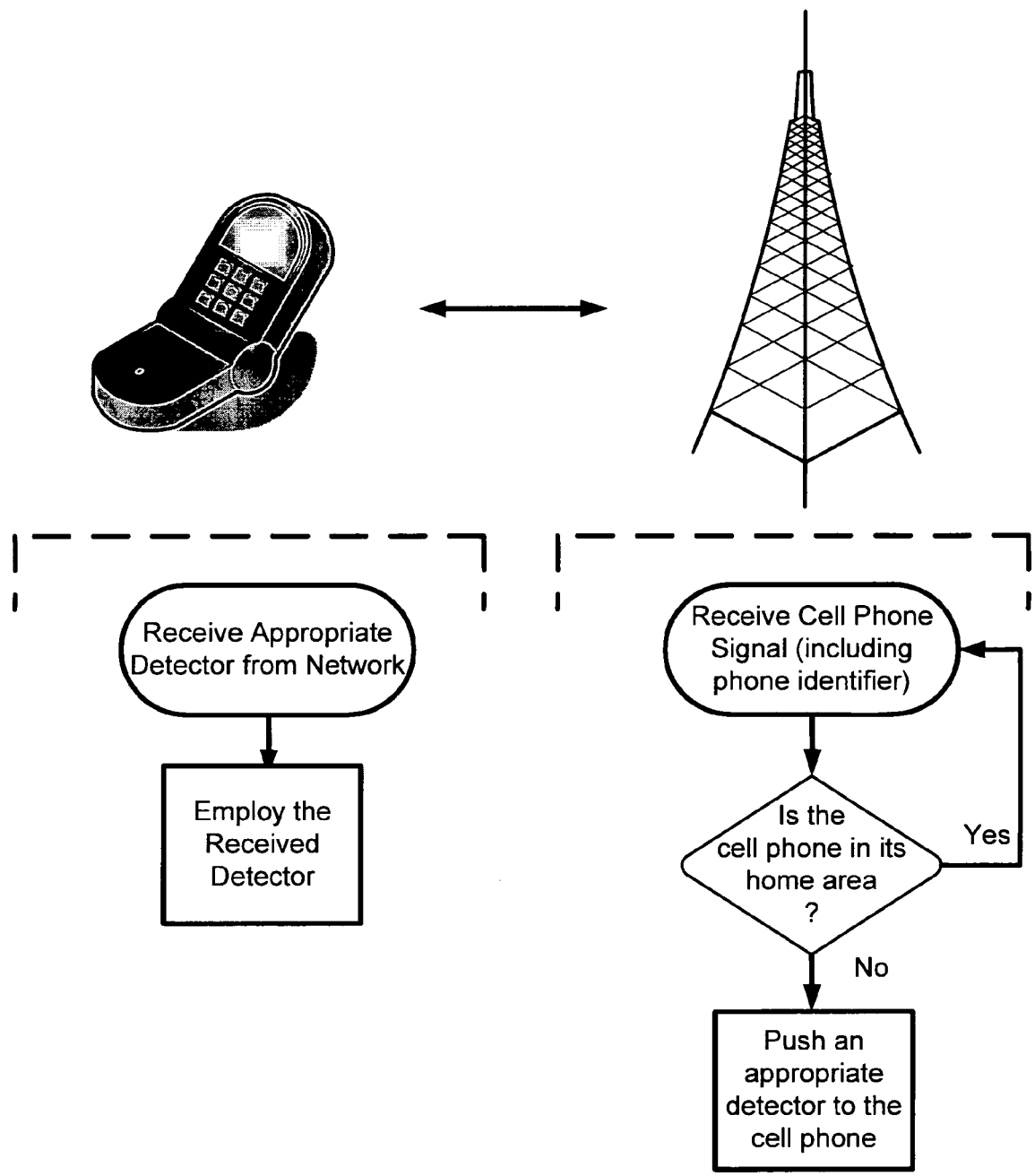
FIG. 5 illustrates a network aware presence capability, where a cell network pushes detection information to a cell phone.

In still another embodiment, a cell phone detector receives information from a network as to which detector it should use. This type of detection is affectionately referred to as a "network aware presence," meaning a wireless carrier (or network) "pushes" an appropriate detector for that region or geographical area to the cell phone for the purpose of content watermark detection (FIG. 5). The terms "appropriate detector" in this context refers to a detection key (e.g., a key is communicated to the phone), an actual detector (software file) is communicated to the phone for downloading, or an index key (e.g., number or seed) is pushed to the phone which allows the cell phone to access a previously stored table to identify which detector or detector key should be employed. As another example, if a cell phone is normally located in Spain, it would have the Spanish content detector loaded or installed on the phone; however, when the phone travels to a different location, like the United Kingdom, the "network aware presence" capability of the wireless carrier detects that the phone has now traveled to the United Kingdom and the content detector for the United Kingdom will be "pushed" automatically (preferably without user intervention) to the phone as a temporary file. The temporary file now becomes the primary content watermark detector. (This process can be initiated by either of the cell phone or network. In the case of the cell phone, it may recognize that it is no longer in its home area and request an appropriate detector from the network. Or, in other implementations, the network may recognize that the cell phone is a quest or is no longer in its home area and push an appropriate detector.) Once the user leaves that region, in this case, the United Kingdom, the temporary file is automatically deleted or de-prioritized and the phone's default content detector is reloaded or activated as the primary content detector.

In another embodiment, multiple different keys are assigned to each geographic location (FIG. 6). For example, Spain may have 10 or more keys assigned to it, while France may have a different set of 10 or more keys assigned to it. In this way, if a particular key is compromised, there are still other keys available for that geography. When prioritizing keys for detection, all keys for a particular geography can be cycled through first or subsets of keys can be identified for higher prioritization.

While the above embodiments have been described as operating in a cell phone environment, the present invention is not so limited. Indeed, many other computing environments will benefit from these techniques. For example, PDAs, laptops, desktops, etc. that are able to determine a location of the device will similarly benefit.

Also our techniques of assigning a key or detector based on geographic location can apply to other machine-readable symbologies as well. For example, consider 2D barcodes. A barcode can be encrypted based on geographic area. For example, a first encrypting key is assigned to a first area and a second encrypting key is assigned to a second, different area, and so on. A detection process determines a current geographical area and finds a detector or decryption key that is associated with the area. A determined detector or decryption key is used to decode or decrypt the 2D symbology. (All told, however, we prefer steganography and digital watermarking, e.g., for their imperceptibility in many applications.)

A few combinations, in addition to those in the claims and those described above, are as follows:

A1. A cell phone comprising:
a radio-frequency transceiver;
electronic processing circuitry; and
memory, wherein said memory comprises executable instructions stored therein for processing by said electronic processing circuitry, said instructions comprising instructions to:
receive information related to a current geographic area in which the cell phone is located;
select, using at least a portion of the received information, a first digital watermark detector that is associated with the current geographic area, a selected first digital watermark detector being selected from a plurality of different digital watermark detectors; and
control the cell phone to employ the selected first digital watermark detector to analyze a signal to obtain a digital watermark message there from, wherein the selected first digital watermark detector corresponds to a particular digital watermark embedder that is uniquely assigned to the geographic area.

A2. The cell phone of A1 wherein the different digital watermark detectors are distinguished from one another based on different watermark detection keys.

A3. The cell phone of A1 wherein the cell phone further comprises a global positioning system (GPS) receiver and the current geographic area is determined from information received by the GPS receiver.

A4. The cell phone of A1 wherein the current geographic area is determined from information obtained from a network communicating with the cell phone via the radio frequency transceiver.

Concluding Remarks

Having described and illustrated the principles of the technology with reference to specific implementations, it will be recognized that the technology can be implemented in many other, different, forms. To provide a comprehensive disclosure without unduly lengthening the specification, applicants hereby incorporates by reference each of the U.S. patent documents referenced above.

The methods, processes, components, modules, generators and systems described above may be implemented in hardware, software or a combination of hardware and software. For example, the watermark data decoding or permutation processes may be implemented in a programmable computer or a special purpose digital circuit. Similarly, watermark data decoding or cryptographic permutation process may be implemented in software, firmware, hardware, or combinations of software, firmware and hardware.

The methods, components and processes described above may be implemented in software programs (e.g., C, C++, Visual Basic, Java, executable binary files, etc.) executed from a system's memory (e.g., a computer readable medium, such as an electronic, optical or magnetic storage device).

The section headings are provided for the reader's convenience. Features found under one heading can be combined with features found under another heading. Of course, many other combinations are possible given the above detailed and enabling disclosure.

The particular combinations of elements and features in the above-detailed embodiments are exemplary only; the interchanging and substitution of these teachings with other teachings in this and the incorporated-by-reference U.S. patent documents are also contemplated.

What is claimed is:

1. A method comprising:
determining a current geographic area;
selecting a first digital watermark detection key that is associated with the current geographic area, a selected first digital watermark detection key being selected from a plurality of digital watermark detection keys; and
controlling an electronic processor programmed as a digital watermark detector to employ the selected first digital watermark detection key to analyze a signal to obtain a digital watermark message there from, in which the selected first digital watermark detection key corresponds to a particular digital watermark embedding key that is uniquely assigned to the geographic area.

2. The method of claim 1 in which each of the plurality of digital watermark detection keys corresponds to a unique geographic area.

3. The method of claim 1 further comprising controlling the digital watermark detector to employ a different digital watermark detection key to analyze the signal to obtain the digital watermark message there from when the message can not be obtained though use of the first digital watermark detection key.

4. The method of claim 1 in which the key comprises a decryption key.

5. A computing device programmed to perform the method of claim 4.

6. The method of claim 1 in which the key comprises a mapping of hiding locations.

7. A computing device programmed to perform the method of claim 6.

8. The method of claim 1 in which a cell phone comprises a global positioning system (GPS) receiver and the current geographic area is determined from information received by the GPS receiver.

9. A programmed computing device comprising instructions stored therein, said instructions cause said programmed computing device to perform the method of claim 8.

10. A non-transitory computer-readable medium comprising instructions stored thereon, said instructions cause an electronic processor to perform the method of claim 8.

11. The method of claim 1 in which the current geographic area is determined from information obtained from a network communicating with a cell phone.

12. The method of claim 1 wherein the digital watermark comprises an orientation component.

13. The method of claim 12 in which prior to analyzing the signal to obtain a digital watermark message, said method comprises determining whether the signal comprises an orientation component, in which analyzing the signal to obtain a digital watermark message is only carried out when the orientation component is detected.

14. A computing device programmed to perform the method of claim 13.

15. A programmed computing device comprising instructions stored therein, said instructions cause said programmed computing device to perform the method of claim 1.

16. A non-transitory computer-readable medium comprising instructions stored thereon, said instructions cause an electronic processor to perform the method of claim 1.

17. A computing device programmed to perform the method of claim 1.

18. A method comprising:
   in a cell phone:
      determining a current geographic area of the cell phone;
      selecting a first digital watermark detector that is associated with the current geographic area, a selected first digital watermark detector being selected from a plurality of different digital watermark detectors; and
      controlling the cell phone to employ the selected first digital watermark detector to analyze a signal to obtain a digital watermark message there from, wherein the selected first digital watermark detector corresponds to a particular digital watermark embedder that is uniquely assigned to the geographic area.

19. The method of claim 18 wherein the different digital watermark detectors are distinguished from one another based on different watermark detection keys.

20. The method of claim 18 further comprising carrying out an action based at least in part on an obtained digital watermark message.

21. The method of claim 18 in which the cell phone comprises a global positioning system (GPS) receiver and the current geographic area is determined from information received by the GPS receiver.

22. A programmed cell phone comprising instructions stored therein, said instructions cause said programmed cell phone to perform the method of claim 21.

23. A non-transitory computer-readable medium comprising instructions stored thereon, said instructions cause the cell phone to perform the method of claim 21.

24. The method of claim 18 in which the current geographic area is determined from information obtained from a network communicating with the cell phone.

25. A programmed cell phone comprising instructions stored therein, said instructions cause said programmed cell phone to perform the method of claim 18.

26. A non-transitory computer-readable medium comprising instructions stored thereon, said instructions cause the cell phone to perform the method of claim 18.

* * * * *